United States Patent Office 3,283,525
Patented Nov. 8, 1966

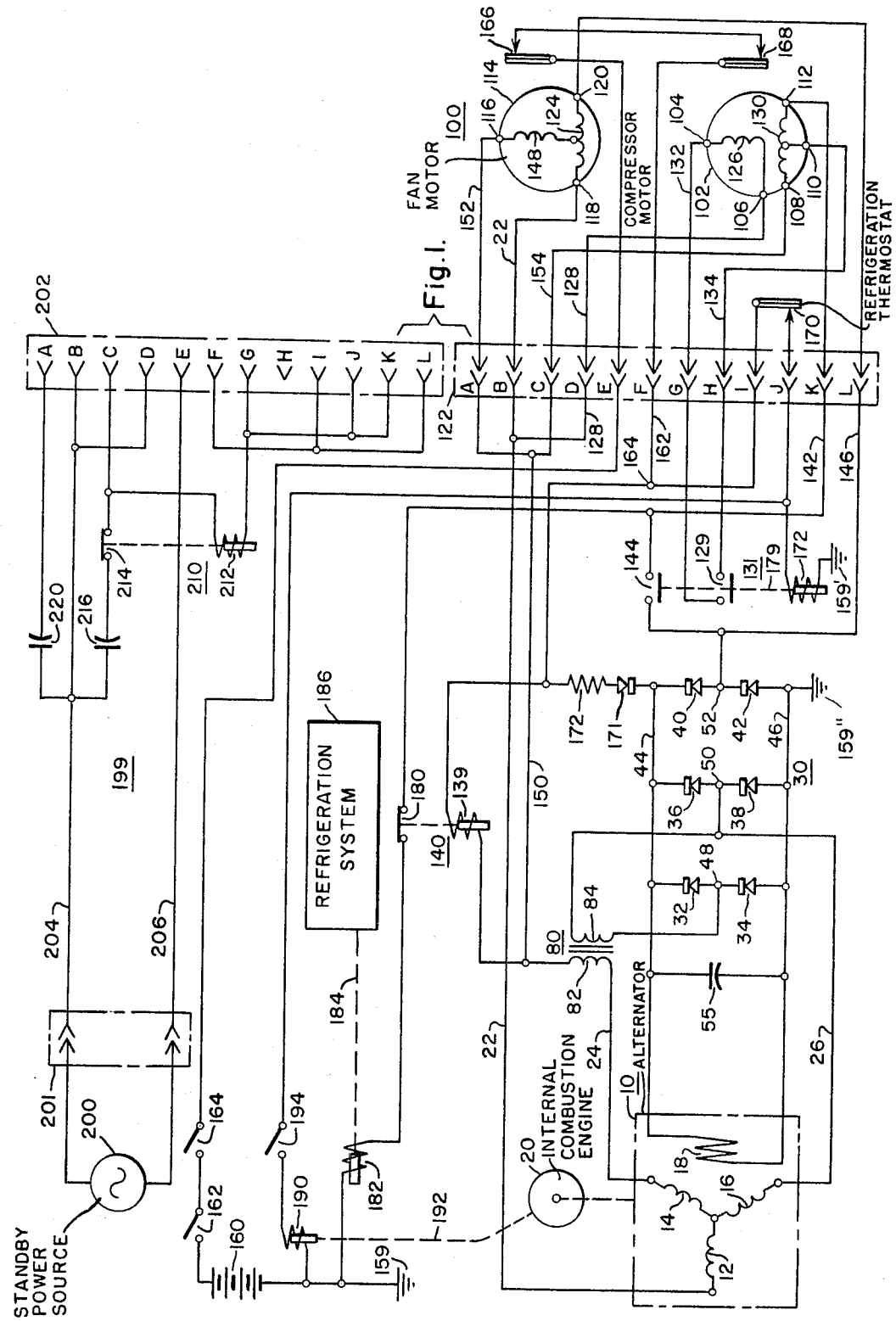

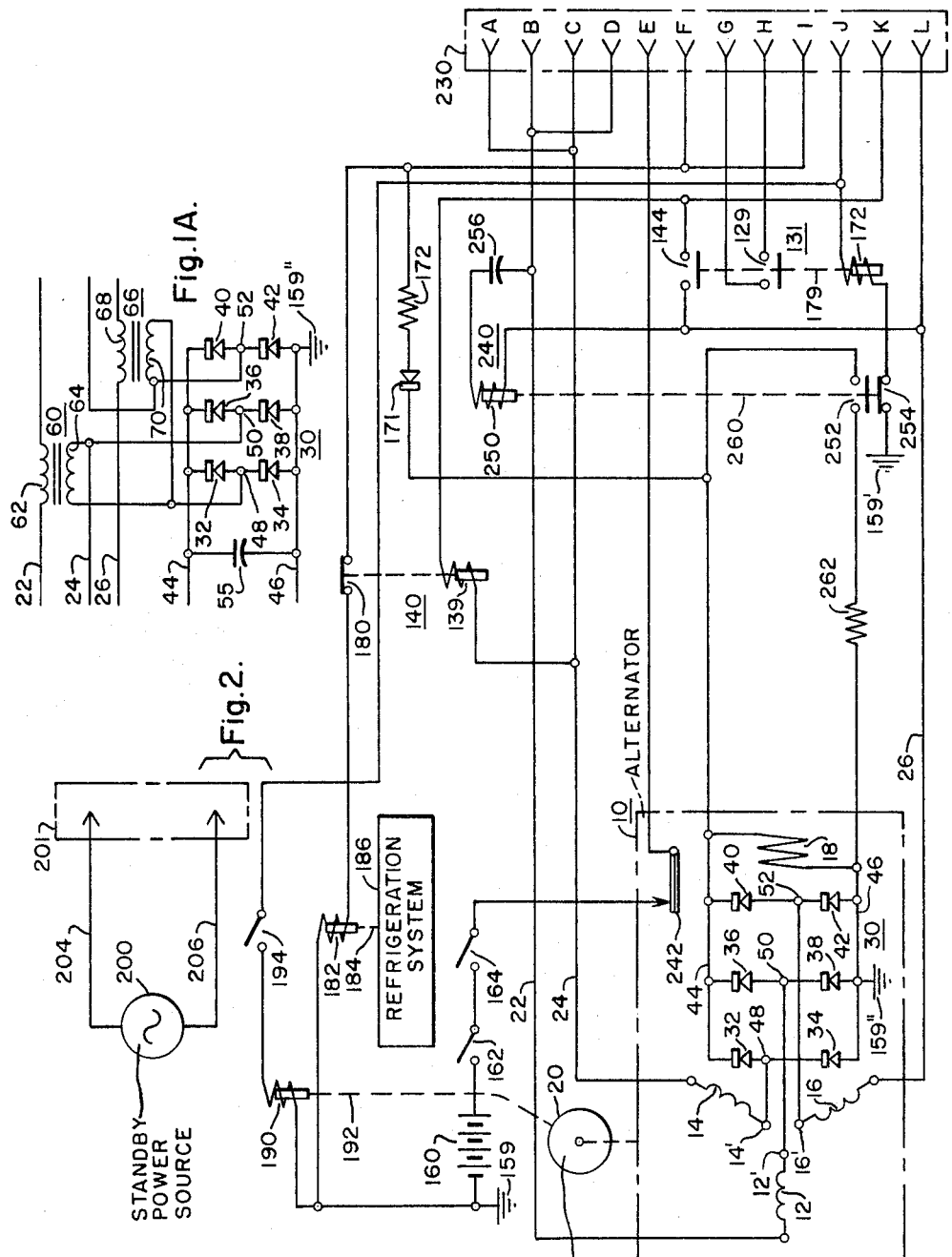

3,283,525
ELECTRICAL CONTROL FOR A REFRIGERATION SYSTEM
Roger F. Fricke, American Township, and Walter E. Wier, Lima, Ohio, assignors to Westinghouse Electric Corporation, Pittsburgh, Pa., a corporation of Pennsylvania
Filed Apr. 9, 1964, Ser. No. 358,430
15 Claims. (Cl. 62—134)

This invention relates in general to truck refrigeration systems and more particularly to truck refrigeration systems in which the compressor and fan motors are powered by an alternating electrical potential.

Most conventional truck electric powered refrigeration systems use a direct current electrical power system. The truck engine is used to mechanically drive an alternating current generator or alternator, and the output of the alternator is rectified to power direct current compressor and fan motors in the refrigeration system. In addition to the high cost of the rectifiers, which necessarily must be sized to handle all of the system power requirements, direct current refrigeration systems require more maintenance and thus are out of service for longer periods of time. The brushes on the direct current motors are particularly subject to wear and must be frequently replaced. Another disadvantage of direct current systems is the fact that they will operate with only one preselected standby voltage.

It is, therefore, desirable to provide a truck refrigeration system in which only the alternator field winding and control elements require a direct current potential. It is desirable for the compressor and fan motors to operate directly from the alternator output, thus eliminating motor brush maintenance and substantially reducing the size and cost of the rectifier elements. To operate the alternating potential motors at peak efficiency and constant line current, the electrical output of the alternator should maintain a constant voltage to frequency ratio, and to further reduce system cost and maintenance, the system should function with as few current transformers as possible.

Accordingly, it is an object of this invention to provide a new and improved truck refrigeration system.

Another object of the invention is to provide a new and improved truck refrigeration system in which the compressor and fan motors operate directly from the output of the alternating current generator without conversion to a direct current potential.

A further object of the invention is to provide a new and improved truck refrigeration system which provides an alternating potential having a constant voltage to frequency ratio for operation of alternating current motors.

Another object of the invention is to provide a new and improved truck refrigeration system which will automatically provide increased refrigeration capacity when the truck engine is idling, and the refrigeration system is calling for cooling.

A further object of the invention is to provide a new and improved truck refrigeration system in which the truck battery assists in supplying excitation potential to the alternator field winding when the direct current potential provided by the field rectifier falls to a predetermined magnitude, thus assuring a constant voltage to frequency ratio for all loads.

Still another object of the invention is to provide a new and improved truck refrigeration system which will operate from any one of two, single or polyphase, stand-by voltage magnitudes.

Another object of the invention is to provide a new and improved truck refrigeration system which will automatically unload the refrigerator compressor if the system starting requirements become excessive.

Briefly, the present invention accomplishes the above cited objects by providing a truck refrigeration system which utilizes the electrical output of an alternator to power alternating current compressor and fan motors. By proper selection of the alternating current motors of the refrigeration system and wiring of the stand-by transfer switch, the stand-by voltage may be single or multiphase, and may be one of two selected voltages. One embodiment of the invention maintains the field excitation current proportional to the alternating current load, and thus maintains a constant voltage to frequency ratio, with only two current transformers instead of the conventional three. The primary windings of the current transformers are connected in series circuit relation with two of the load conductors, and the secondary windings each have one end connected in common to one of the input terminals of a three phase full wave field rectifier, and the remaining ends of the secondary windings are each connected to a different input terminal of the three phase field rectifier. Another embodiment of the invention maintains the field excitation current proportional to the load and thus maintains an alternator output having a constant voltage to frequency ratio with only one current transformer. The primary winding of the single current transformer is connected in series circuit relation with one of the load conductors, and the secondary winding of the current transformer is connected to two of the alternating current input terminals of the three phase, full wave field rectifier. Still another embodiment of the invention completely eliminates the use of current transformers and still maintains an alternator output having a constant voltage to frequency ratio, by connecting the field rectifier in the neutral of the alternator armature windings and using the truck battery to provide excitation at light and no loads.

Since the refrigeration system capacity is proportional to the truck engine speed when alternating current compressor and fan motors are used, the refrigeration thermostat may be used to signal for an increase in truck engine idle speed, as well as for signalling the refrigeration compressor to operate.

A voltage sensitive relay is used to unload the compressor when the system voltage drops to a predetermined magnitude.

A blocking rectifier is used to isolate the battery from the field rectifier when the potential of the field rectifier exceeds that of the battery. When the battery potential exceeds the output potential of the field rectifier, the battery, along wih a resistor assists the field rectifier in supplying the excitation requirements for the alternator field winding.

Further objects and advantages of the invention will become apparent as the following description proceeds and features of novelty which characterize the invention will be pointed out in particularity in the claims annexed to and forming a part of the specification.

For a better understanding of the invention, reference may be had to the accompanying drawings in which:

FIGURE 1 is a schematic diagram illustrating one embodiment of the invention;

FIG. 1A is a schematic diagram illustrating an alternative embodiment for a portion of the circuit illustrated in FIG. 1; and FIG. 2 is a schematic diagram illustrating another embodiment of the invention.

Referring now to the drawings, and FIG. 1 in particular, there is illustrated a schematic diagram of a truck electrical refrigeration system descriptive of the invention. More specifically, an alternator 10 having armature phase windings 12, 14 and 16, and an excitation field winding 18, is disposed to supply electrical energy to electrical conductors 22, 24 and 26. Alternator 10 may be mechanically driven by a suitable drive 20, such as being belted to the truck engine.

In order to provide a direct current potential for field excitation winding 18 as well as for various control functions, a rectifier 30 may be provided. Rectifier 30 may be a three phase, full wave, bridge rectifier, as illustrated, having rectifier elements 32, 34, 36, 38, 40 and 42, and may be grounded at 159″. It is to be understood that all of the ground connections listed in the specification may be connected together and they are all given the same reference numeral to denote this. Prime marks are added merely to distinguish ground locations for locating various circuit components.

Rectifier 30 produces a direct current potential across conductors 44 and 46 when an alternating potential is applied to input terminals 48, 50 and 52. Rectifier 30 is connected to provide a direct current potential to the field winding 18 through conductors 44 and 46. Capacitor 55 may be connected across conductors 44 and 46 to smooth the ripple in the direct current potential.

A conventional method of obtaining an excitation potential proportional to load is to utilize three current transformers, with the primary windings of the current transformers being connected in series circuit relation with the line conductors 22, 24 and 26, and the secondary windings being connected in delta and the output being connected to the input terminals 48, 50 and 52 of bridge rectifier 30. In order to reduce the cost, size and maintenance of the electrical system, as well as increase its efficiency, it is desirable to reduce the number of current transformers.

If the characteristics of the system are such that an effective transformer turn ratio of one to one may be used, one of the transformers may be eliminated and the connections made as illustrated in FIG. 1A, with like reference numerals in FIGS. 1 and 1A indicating like components. More specifically, a current transformer 60, having primary and secondary windings 62 and 64, respectively, and a current transformer 66, having primary and secondary windings 68 and 70, may be utilized. Current transformer 60 may have its primary winding 62 connected in series circuit relation with line conductor 22, and current transformer 66 may have its primary winding 68 connected in series circuit relation with line conductor 26. Secondary winding 64 of current transformer 60 may be connected across input terminals 48 and 50 of rectifier 30, and secondary winding 70 of current transformer 66, with its secondary winding terminals reversed, may be connected across input terminals 48 and 52. Various equivalent connections may also be made. In addition to eliminating a current transformer, the system shown in FIG. 1A has the advantage of eliminating the necessity of a ground in the alternating current system to remove static charges. The direct current ground 159″ provides an effective ground for the alternating current system.

If sufficient direct current power can be obtained from two lines of the three phase alternator 10, the current transformer arrangement shown in FIG. 1 may be utilized, with another current transformer being eliminated. More specifically, a current transformer 80 having primary and secondary windings 82 and 84, respectively, may have its primary winding 82 connected in series circuit relation with one of the line conductors, such as conductor 24, and its secondary winding 84 connected to two of the input terminals of rectifier 30, such as input terminals 48 and 50. Line conductor 26 may be connected to input terminal 50 of rectifier 30, and input terminal 52 of rectifier 30 may be connected directly to the load circuit, as will hereinafter be described. It is to be understood that other equivalent connections may also be made.

Current transformer 80 will provide sufficient excitation for field winding 18 to maintain an alternating current output having a constant voltage to frequency ratio at all except very light loads. At light loads, a small additional amount of excitation is obtained from the vehicle battery 160, as will hereinafter be explained, to maintain a constant voltage to frequency ratio at light loads.

The alternator 10 is connected to load 100, which may be the electrical portion of a refrigeration system, including a compressor motor 102 having input terminals 104, 106, 108, 110 and 112, and a fan motor 114 having input terminals 116, 118 and 120. A plug-socket receptacle or connnector 122, such as a conventional Cinch-Jones connector, may be used to conveniently connect the load 100 to the vehicle electrical system.

Phase winding 12 of alternator 10 is connected to terminal 118 and one end of the fan motor winding 124 through line conductor 22 and to terminal 106 at one end of the compressor motor winding 126 through conductor 128. The other end of compressor motor winding 126 at terminal 104 is connected through a set of relay contacts 129 on relay 131, the purpose of which will hereinafter be explained, to the electrical center of compressor motor winding 130 at terminal 110. Conductor 132 connects terminal 104 of compressor motor 102 to one of the sets of contacts 129, and the other of the set of contacts 129 is connnected to compressor motor terminal 110 through conductor 134. Phase winding 14 of alternator 10 is connected through primary winding 82 of current transformer 80, through conductors 150 and 152 to one end of fan motor winding 148 at terminal 116, and through the conductors 150 and 154 to one end of compressor motor winding 130 at terminal 108. Phase winding 16 of alternator 10 is connected through terminals 50 and 52 of rectifier 30 to load 100. Connection is made to terminal 112 of compressor motor 102 through conductor 142 and contacts 144 of relay 131. Connection is made to terminal 120 of fan motor 114 through conductor 146.

The connections to the compressor and fan motors 102 and 114, respectively, will allow them to be operated from a stand-by source of either single or three phase power. Also by proper selection of motors 102 and 114 they may be operated at one of two preselected voltages, as will be hereinafter described.

The vehicle battery 160 is connected into the electrical system from ground 159 to vehicle ignition switch 162, refrigeration on-off switch or control 164, series connected fan and compressor motor overload protectors 166 and 168, respectively, and through refrigeration thermostat 170 to coil 172 of relay 131 and to ground 159′. Thus, when the ignition switch 162 is closed and the refrigeration control 164 is closed, battery voltage will be applied to relay coil 172 of relay 131, if the motor overloads 166 and 168 are closed and the refrigeration thermostat 170 is closed. Refrigeration thermostat 170 will be disposed in a suitable location in the cooling compartment of the vehicle, and will be closed when the refrigeration compartment requires additional cooling.

Assuming the motor overload protectors 166 and 168 are closed and thermostat 170 is closed, relay 131 will be energized, closing normally open contacts 129 and 144 through a suitable linkage 179. When the ignition switch 162 is closed and the vechicle drive 20 is started, the alternator 10 will also be driven, allowing the alternator 10 to build up an alternating output potential as soon as an excitation potential is applied to its field winding 18. When alternator 10 is unloaded or is loaded very lightly, very little or no excitation current will be provided from current transformer 80. Therefore, potential from battery 160 is applied to rectifier 30, after going through motor overload protectors 166 and 168, but before going through the refrigeration thermostat 170. Therefore, battery potential is available to rectifier 30 whether or not the refrigeration thermostat 170 is open or closed. In order to utilize excitation potential from battery 160 only at light loads and no load, a rectifier 171 is connected between battery 160 and bus 44 of rectifier 30, and poled to allow excitation current to flow from battery 160 only when the battery potential exceeds the load current produced potential developed by rectifier 30. Thus, when ignition 162 is closed and the refrigeration control 164 is closed, battery potential is applied to field winding 18 if motor overloads 166 and 168 are closed. A similar overload protector, not shown, may be connected in series with overload protectors 166 and 168 and disposed to protect alternator 10 against overheating, if desired. When the ignition switch 162 and refrigeration control 164 are closed as well as overloads 166 and 168, rectifier 30 will supply excitation current to field winding 18 and alternator 10 will build-up an output potential. When alternator 10 builds up an output potential, the fan motor 114 will be energized through the connections in the conductors hereinbefore described. When refrigeration thermostat 170 is closed, the compressor motor 102 will be energized through contacts 129 and 144 of relay 131.

As the load current builds up, the direct current output of rectifier 30 increases due to the increased current applied to it from current transformer 80 and alternator winding 16, and the battery 160 supplies less excitation current. When the potential of rectifier 30 applied to bus 44 exceeds the potential of battery 160, battery 160 will cease to supply excitation current and rectifier 171 prevents or blocks current flow back to the battery 160. Thus, the battery 160, by providing excitation current at light and no loads maintains the constant voltage to frequency ratio of the alternator output. At light or no load, a larger percentage of the excitation is used to supply the air gap and magnetic circuit magnetomotive force than is required to cancel demagnetizing ampere turns, and if no additional excitation potential were to be supplied from battery 160, the voltage to frequency ratio of the alternator output would reduce until it would go to zero at no load.

Resistor 172 is connected in series circuit relation with the rectifier 171 and battery 160, and should be selected to provide rated alternator output potential of alternator 10 at no load. Resistor 172 provides voltage regulation of alternator 10 during the time the battery 160 is supplying all or a portion of the excitation current of field winding 18. Further, without resistor 172, the field excitation current through field winding 18 would be constant until the output voltage of rectifier 30 exceeds the voltage of battery 160, and the constant voltage to frequency ratio of alternator 10 would not be maintained constant during this period. Thus, the function of resistor 172 is very important in maintaining a constant voltage to frequency ratio of the alternator electrical system.

Upon the energization of relay 131 and the application of alternating voltage to compressor motor 102, the system voltage may fall below the desired minimum if the compressor starting load is excessive. In order to prevent this from happening, a relay 140 may have its electromagnetic coil 139 connected across the alternator output, such as phases 14 and 16. Relay 140 is sensitive to voltage drop, and has a set of contacts 180 which open when line voltage is applied. If the system voltage drops below a predetermined magnitude, contacts 180 close, connecting battery potential to solenoid 182 and to ground 159. Solenoid 182, through a suitable linkage mechanism 184, operates a compressor by-pass valve (not shown) in refrigeration system 186 to unload the compressor motor 102. When the voltage drop decreases and the system voltage increases to a predetermined magnitude, contacts 180 of relay 140 are again opened, and the compressor by-pass valve in the refrigeration system 186 is closed.

One of the inherent advantages of operating compressor and fan motors 102 and 114, respectively, on alternating potential, is the fact that as the speed of the vehicle drive 20 increases, the speed of the compressor and fan motors 102 and 114 will increase proportionately. Therefore, as the speed of drive 20 increases, the capacity of refrigeration system 186 will increase. This not only will provide increased capacity during over the road operation of the refrigeration system, but will also permit increasing the refrigeration capacity by raising the engine idle speed to a predetermined minimum. In order to increase the engine idle speed only when the thermostat 170 is closed and calling for cooling, a solenoid 190, having a suitable linkage mechanism 192 connected to drive 20, may be electrically connected to the load side of thermostat 170. When thermostat 170 closes its contacts, battery potential is applied to solenoid 190, as well as to relay 131, with solenoid 190 operating the idle control in drive 20 to raise the speed of drive 20 to that necessary to provide the desired refrigeration capacity. A switch 194 may be provided to switch the idle control off during over the road operation of the vehicle.

When the vehicle drive 20 is not operating, the load 100 may be connected to a stand-by source of alternating potential 200 through stand-by control 199. A convenient connector 201 may be used to connect the stand-by potential 200 with stand-by control 199. The plug portion of connector 122 may be removed and placed into transfer socket connector 202. Transfer socket connector 202 is shown electrically wired for single phase operation at a single voltage. However, by proper selection of the motors 102 and 114, and appropriate wiring of socket connector 202, a single refrigeration system may be used with either single or three phase voltage, and on one of two stand-by voltage magnitudes.

More specifically, source potential 200 is connected to transfer socket 202 through conductors 204 and 206. In order to start compressor motor 102 with the high torque required, winding 130 of compressor motor 102 is used as an auxiliary winding, with capacitor 216 connected in series circuit relation with winding 130. When the refrigeration thermostat 170 calls for cooling and closes its contacts, winding 126 of compressor motor 102 is connected directly to source potential 200, and winding 130 is connected to source potential 200 through a starting capacitor 216 and normally closed contacts 214 of relay 210. Because of the electrical action of capacitor 216, the voltage across winding 124 does not build-up instantaneously. Winding 212 of relay 210 is connected across winding 124 and senses the winding voltage. When the voltage across winding 124 reaches a predetermined magnitude, the time of which is determined by capacitor 216, relay 210 is actuated, opening contacts 214 and disconnecting the capacitor 216 in winding 130 from the source of potential 200.

Fan motor 114 is connected to source potential 200 through capacitor 220 and operates as a single phase, capacitor run motor independent of the action of the refrigeration thermostat 170.

Using the teachings of copending application, Serial No. 349,867, filed March 6, 1964 by W. E. Wier, and assigned to the same assignee as the present application, an arrangement for obtaining an excitation current proportional to load current is disclosed which eliminates the requirement of utilizing any current transformers. FIG. 2 is a schematic diagram illustrating another embodiment of this invention which utilizes the above referred to arrangement for eliminating current transformers. Like reference numerals in FIGS. 1 and 2 indicate like components. The load 100 shown in FIG. 1 is not duplicated in FIG. 2, as the plug portion of connector 122 shown in FIG. 1 may be connected to the socket 230 shown in FIG. 2, thus connecting the load 100 to the refrigeration electrical system shown in FIG. 2. Also, the stand-by control 199 is not duplicated in FIG. 2, as the stand-by system for either FIG. 1 or 2 may be the same.

Basically, the difference between the electrical systems shown in FIGS. 1 and 2 is the elimination of current transformer 80 and the location, circuitwise, of full wave, three phase rectifier 30. Also, additional protective devices 240 and 242 are shown in FIG. 2. More specifically, rectifier 30 is connected in the neutral of alternator phase windings 12, 14 and 16, with neutral end 12' of phase winding 12 being connected to input terminal 50 of rectifier 30, neutral end 14' of phase winding 14 being connected to input terminal 48, and neutral end 16' of phase winding 16 being connected to input terminal 52. Thus, a direct current potential proportional to the load current is produced across conductors 44 and 46 and also across field winding 18, which enables alternator 10 to produce an electrical output having a constant voltage to frequency ratio. Further, this is accomplished without using current transformers. Similar to FIG. 1, battery 160, along with the action of resistor 172 and rectifier 171, helps provide excitation current of the proper magnitude for light and no loads, to thus maintain a constant voltage to frequency ratio for all alternator loads.

Protective device 242 is an overload protector for alternator 10, and its contacts are connected in series circuit relation with battery 160 and overload protectors 166 and 168 in the fan and compressor motors 114 and 102, respectively.

Protective device 240 is a relay having an electromagnetic coil 250, normally open contacts 252, and normally closed contacts 254. Relay 240 along with capacitor 256, form a frequency sensitive network, and its function is explained in detail in copending application, Serial No. 347,890, filed February 27, 1964, by W. E. Wier, and assigned to the same assignee as the present application. Broadly, the series circuit comprising electromagnetic coil 250 of relay 240 and capacitor 256 is connected to be responsive to the output voltage of alternator 10, across line conductors 22 and 26. The division of the alternating voltage across the series connected coil 250 and capacitor 256 will depend upon the value of capacitor 256 and the frequency of the alternator output voltage. Thus, by the proper selection of the value of capacitor 256, relay 240 may be actuated at the desired output frequency of alternator 10. Since the ratio of the alternator voltage to alternator frequency is constant, and the frequency of the output voltage of alternator 10 is related to alternator speed, a preselected voltage output and speed of alternator 10 may be used to determine when relay 240 should be actuated, thus preventing operation of the system at detrimental speeds and voltages. When relay 240 is actuated, normally open contacts 252 close and normally open contacts 254 open, through action of a suitable linkage 260. When normally closed contacts 254 are open, relay 172 is deenergized, opening contacts 144 and 129, and removing compressor motor 102 from the system. When normally open contacts 252 close, resistor 262 is connected across the output of rectifier 30 and field winding 18, reducing the excitation current through field winding 18 and thus reducing the output voltage and frequency of alternator 10. When the frequency and output voltage of alternator 10 is reduced to a predetermined magnitude, relay 240 will be deenergized, due to a reduction in voltage across relay coil 250 and the increase in voltage across capacitor 256, and the system is allowed to return to its normal constant voltage to frequency ratio.

The refrigeration system disclosed herein has many advantages. The number of current transformers required has been reduced or eliminated, thus reducing system cost and maintenance. Large, costly rectifiers are not required, as only a small portion of the alternator output potential is rectified. The motors in the refrigeration system are operated directly from the alternator output potential, which is controlled to have a constant ratio of voltage to frequency. This eliminates direct current motors and costly maintenance of motor brushes, and the replacement of large costly rectifiers. Further, by operating the motors on alternating current potential, the refrigeration capacity may be increased by increasing the speed of the vehicle engine driving the alternator. An engine idle control associated with the refrigerator thermostat automatically increases the vehicle engine speed when the vehicle is idling, to produce the refrigeration capacity required. The use of alternating current motors also allows more flexibility from the standpoint of stand-by voltages. For example, a refrigeration system may be designed to operate on either single or three phase, and from one of two pre-selected voltages. The system also automatically takes care of reducing the compressor load to aid starting of the compressor motor, if necessary.

We claim as our invention:

1. A vehicle refrigeration system comprising an alternating current generator having a direct current field winding and output terminals; driving means driving said alternating current generator that may vary in driving speed; refrigeration means, including a compressor and thermostat; an alternating current load, including an alternating current motor driving said compressor; said alternating current load being connected in circuit relation with the output terminals of said alternating current generator; means connected in circuit relation with said field winding providing an excitation current proportional to said alternating current load, which produces an electrical output at the output terminals of said alternating current generator having a constant ratio of voltage to frequency; means connected in circuit relation with said thermostat and operably connected with said driving means, increasing the speed of said driving means to a predetermined minimum when said thermostat indicates cooling is required and the driving speed is below said predetermined minimum.

2. A vehicle refrigeration system comprising a three-phase alternating current generator having a direct current field winding and three output terminals; means driving said alternating current generator that may vary in driving speed; an alternating current load including alternating current motors connected in circuit relation with the output terminals of said alternating current generator; refrigeration means including a compressor, compressor drive motor and thermostat; first and second current transformers each having a primary and secondary winding; three-phase bridge rectifier means having three input terminals and output terminals; a source of direct current potential; the primary windings of said first and second current transformers being connected in series circuit relation with two of the output terminals of said alternating current generator and said alternating current load; means connecting the secondary windings of said first and second current transformers in circuit relation with the remaining output terminal of said alternating current generator, said alternating current load, and the input terminals of said rectifier means, providing a direct current output potential proportional to the alternating current load; the output terminals of said rectifier means being connected in circuit relation with said field winding and supplying an excitation current proportional to said alternating current load; means connecting said source of direct current potential in circuit relation with said field winding; said source of direct current potential supplying excitation current when the output potential of said rectifier means is less than the magnitude of said source of direct current potential, to maintain an electrical output of said alternating current generator having a constant ratio of voltage to frequency.

3. The vehicle refrigeration system of claim 2 including protective means, comprising a relay having an electromagnetic coil and contacts, and a capacitor, said electromagnetic coil and said capacitor being connected serially between two of the output terminals of said alternating current generator, said contacts being disposed to reduce the output potential of said alternating current generator when the output frequency of said alternating current generator reaches a magnitude which changes the voltage distribution across the serially connected electromagnetic coil and capacitor sufficiently to energize said relay.

4. The vehicle refrigeration system of claim 2 including voltage sensing means connected in circuit relation with the output terminals of said alternating current generator; and unloading means; said unloading means being responsive to said voltage sensing means, reducing the load provided by said compressor on the compressor drive motor when the output voltage of said alternating current generator falls below a predetermined magnitude.

5. The vehicle refrigeration system of claim 2 including means responsive to said thermostat increasing the driving speed of said driving means, when the driving speed is below a predetermined minimum and said thermostat indicates cooling is required.

6. A vehicle refrigeration system comprising a three-phase alternating current generator having a direct current field winding and three output terminals; means driving said alternating current generator that may vary in driving speed; an alternating current load, including alternating current motors, connected in circuit relation with the output terminals of. said alternating current generator; refrigeration means including a compressor, compressor drive motor and thermostat; a current transformed having a primary and secondary winding; three-phase bridge rectifier means having three input terminals and output terminals; one of the output terminals of said alternating current generator being connected directly to said alternating current load, another of the output terminals being connected to said alternating current load through the primary winding of said current transformer, and the remaining output terminal being connected to said alternating current load through said three-phase bridge rectifier means; means connecting the secondary winding of said current transformer in circuit relation with two of the input terminals of said rectifier means; said rectifier means being connected in circuit relation with said field winding, providing an excitation current proportional to the alternating current load; a source of direct current potential; said source of direct current potential being connected in circuit relation with said field winding and supplying excitation current when the output potential of said rectifier means is less than the magnitude of said source of direct current potential, to maintain an electrical output of said alternating current generator having a constant ratio of voltage to frequency.

7. The vehicle refrigeration system of claim 6 including protective means, comprising a relay having an electromagnetic coil and contacts, and a capacitor, said electromagnetic coil and said capacitor being serially connected across two of the output terminals of said alternating current generator, said contacts being disposed to reduce the output potential of said alternating current generator when a predetermined output frequency is reached which changes the voltage distribution across the serially connected electromagnetic coil and capacitor to energize said relay.

8. The vehicle refrigeration system of claim 6 including voltage sensing means connected in circuit relation with the output terminals of said alternating current generator; and unloading means; said unloading means being responsive to said voltage sensing means, reducing the load presented by said compressor on said compressor drive motor when the output voltage of said alternating current generator falls below a predetermined magnitude.

9. The vehicle refrigeration system of claim 6 including means responsive to said thermostat increasing the driving speed of said driving means when said thermostat indicates cooling is required and the driving speed is below a predetermined minimum.

10. An electric circuit for vehicle refrigeration systems comprising an alternating current generator having a plurality of phase windings, a direct current field winding and output terminals; said plurality of phase windings each having an output end connected to an output terminal, and a neutral end; means driving said alternating current generator that may vary in driving speed; an alternating current load including alternating current motors connected in circuit relation with the output terminals of said alternating current generator; rectifier means having input and output terminals; the neutral ends of said plurality of phase windings being connected in circuit relation with the input terminals of said rectifier means and producing a direct current potential at the output terminals of said rectifier means proportional to the alternating current load; said rectifier means being connected in circuit relation with said field winding and providing an excitation current proportional to the alternating current load; a source of direct current potential; said source of direct current potential being connected in circiut relation with said field winding and supplying excitation current when the output potential of said rectifier means is less than the magnitude of said source of direct current potential, to maintain an electrical output of said alternating current generator having a constant ratio of voltage to frequency; and protective means including a capacitor, and a relay having an electromagnetic coil and contacts disposed to reduce the output potential of said alternating current generator when said relay is energized; said electromagnetic coil and said capacitor being connected serially across two of the output terminals of said alternating current generator, reducing the output potential of said alternating current generator when a predetermined output frequency is reached which changes the distribution of voltage across the serially connected electromagnetic coil and capacitor to the point required to energize said relay.

11. In combination, an alternating current generator having first, second and third phase windings, a direct current field winding and output terminals; said first, second and third phase windings each having an output end connected to an output terminal, and a neutral end; means driving said alternating current generator that may vary in driving speed; refrigeration means, including a compressor; an alternating current load connected in circuit relation with the output terminals of said alternating current generator, including an alternating current motor driving said compressor; rectifier means having input and output terminals; the neutral ends of said first, second and third phase windings being connected in circuit relation with the input terminals of said rectifier means; the output terminals of said rectifier means being connected in circuit relation with said field winding, providing an excitation current proportional to the alternating current load; a source of direct current potential; means connecting said source of direct potential in circuit relation with said field winding; said source of direct current potential supplying excitation current when the magnitude of the output potential of said rectifier means is less than the magnitude of said source of direct current potential, to maintain an electrical output of said alternating current generator having a constant ratio of voltage to frequency; relay means connected in circuit relation with the output terminals of said alternating current generator; said relay means being actuated when the output voltage of said alternating current generator drops to a predetermined magnitude; and unloading means; said unloading means being responsive to said relay means; said unloading means reducing the load presented by said compressor on the alternating current motor when said relay means is actuated.

12. In combination, an alternating current generator having first, second and third phase windings, a direct current field winding and output terminals; said first, second and third phase windings each having an output end connected to an output terminal of said alternating current generator, and a neutral end; driving means driving said alternating current generator that may vary in driving speed; a refrigeration system including a compressor and thermostat; an alternating current load connected in circuit relation with the output terminals of said alternating current generator, including an alternating current motor driving said compressor; means connecting the output terminals of said alternating current generator to said alternating current motor driving said refrigeration compressor, when said thermostat indicates cooling is required; rectifier means having input and output terminals; the neutral ends of said first, second and third phase windings being connected in circuit relation with the input terminals of said rectifier means, the output terminals of said rectifier means being connected in circuit relation with said field winding, and providing an excitation current proportional to the alternating current load; a source of direct current potential; means connecting said source of direct current potential in circuit relation with said field winding; said source of direct current potential supplying excitation current when the magnitude of said output potential of said rectifier means is less than the magnitude of said source of direct current potential, to maintain an electrical output of said alternating current generator having a constant ratio of voltage to frequency; and means responsive to said thermostat increasing the driving speed of said driving means, if the driving speed is below the predetermined minimum when said thermostat indicates cooling is required.

13. In combination, an alternating current generator having first, second and third phase windings, a direct current field winding and output terminals; said first, second and third phase windings each having an output end connected to an output terminal, and a neutral end; driving means driving said alternating current generator that may vary in driving speed; a refrigeration system including a compressor and a thermostat; an alternating current load connected in circuit relation with the output terminals of said alternating current generator, including an alternating current motor driving said compressor; means connecting the output terminals of said alternating current generator to the alternating current motor driving said refrigeration compressor, when said thermostat indicates cooling is required; rectifier means having input and output terminals; the neutral ends of said first, second and third phase windings being connected in circuit relation with the input terminals of said rectifier means; the output terminals of said rectifier means being connected in circuit relation with said field winding and providing an excitation potential proportional to the alternating current load; a source of direct current potential; a resistor; a rectifier; said source of direct current potential, resistor and rectifier being connected in circuit relation with said field winding; said resistor being sized to allow sufficient excitation current to flow from said source of potential to cause the alternating current generator to produce rated voltage at no load; said rectifier being poled to allow said source of potential to provide excitation current when the magnitude of said source of potential exceeds the magnitude of the direct current potential applied to said field winding by said rectifier means, to maintain an electrical output at the terminals of said alternating current generator that has a constant ratio of voltage to frequency for all alternating current loads; means responsive to said thermostat increasing the driving speed of said driving means if the driving speed is below a predetermined minimum when said thermostat indicates cooling is required; relay means connected in circuit relation with the output terminals of said alternating current generator; said relay means being actuated when the output voltage of said alternating current generator drops to a predetermined magnitude; and unloading means; said unloading means being responsive to said relay means; said unloading means reducing the load of said compressor on the alternating current motor when said relay means is actuated.

14. In combination, an alternating current generator having a direct current field winding and output terminals; driving means driving said alternating current generator that may vary in driving speed; refrigeration means including a compressor and a thermostat; an alternating current load connected in circuit relation with the output terminals of said alternating current generator, including an alternating current motor driving said compressor; means connecting the output terminals of said alternating current generator to the alternating current motor driving said compressor, when said thermostat indicates cooling is required; current transformer means having primary and secondary winding means; rectifier means having input and output terminals; the primary winding means of said current transformer means being connected in series circuit relation with the output terminals of said alternating current generator and said alternating current load; means connecting the secondary winding means of said current transformer means in circuit relation with the input terminals of said rectifier means; the output terminals of said rectifier means being connected in circuit relation with said field winding and providing an excitation potential proportional to the alternating current load; a source of direct current potential; a resistor; a rectifier; said source of direct current potential, resistor and rectifier being connected in circuit relation with said field winding; said resistor being sized to allow sufficient excitation current to flow from said source of potential to cause said alternating current generator to produce rated voltage at no load; said rectifier being poled to allow said source of potential to provide excitation current when the magnitude of the source of direct current potential exceeds the magnitude of direct current potential applied to said field winding by said rectifier means, to maintain an electrical output at the terminals of said alternating current generator that has a constant ratio of voltage to frequency at all alternating current loads; means responsive to said thermostat increasing the driving speed of said driving means, if the driving speed is below a predetermined minimum when said thermostat indicates cooling is required; relay means connected in circuit relation with the output terminals of said alternating current generator; said relay means being actuated when the output voltage of said alternating current generator drops to a predetermined magnitude; and unloading means; said unloading means being responsive to said relay means; said unloading means reducing the load of said compressor on the alternating current motor when said relay is actuated.

15. A vehicle refrigeration system comprising:
  an alternating current generator having a field winding and output terminals;
  means driving said alternating current generator that may vary in driving speed;
  refrigeration means, including a compressor and compressor drive motor;
  a load connected in circuit relation with said output terminals, including the compressor motor;
  means providing an excitation current in the field winding of said alternating current generator whose magnitude provides an electrical output at said output terminals having a substantially constant voltage to frequency ratio;

voltage sensing means connected in circuit relation with said output terminals;

unloading means for reducing the load on said compressor motor;

said unloading means being responsive to said voltage sensing means, reducing the load on said compressor motor when the output voltage of said alternating current generator drops to a predetermined magnitude.

References Cited by the Examiner

UNITED STATES PATENTS

| | | | |
|---|---|---|---|
| Re. 21,837 | 6/1941 | Alexander et al. | 62—134 |
| 2,357,086 | 8/1944 | Crever | 318—148 X |
| 2,455,935 | 12/1948 | Keller | 322—27 X |
| 2,482,588 | 9/1949 | LeTourneau | 322—27 |
| 2,786,334 | 3/1957 | Wolf | 318—148 X |
| 2,844,783 | 7/1958 | Chandler et al. | |
| 3,034,035 | 5/1962 | Baumann et al. | |
| 3,042,850 | 7/1962 | Kerr | 322—27 |
| 3,074,002 | 1/1963 | Potter. | |

ROBERT A. O'LEARY, *Primary Examiner.*

MEYER PERLIN, *Examiner.*

W. E. WAYNER, *Assistant Examiner.*